(12) United States Patent
Ferrari et al.

(10) Patent No.: US 6,655,884 B2
(45) Date of Patent: Dec. 2, 2003

(54) MACHINE TOOL

(75) Inventors: Maurizio Ferrari, Piacenza (IT); Carlo Massari, San Giorgio (IT)

(73) Assignee: Jobs S.p.A., Piacenza (IT)

( * ) Notice: Subject to any disclaimer, the term of this patent is extended or adjusted under 35 U.S.C. 154(b) by 0 days.

(21) Appl. No.: 10/092,632

(22) Filed: Mar. 8, 2002

(65) Prior Publication Data

US 2002/0131836 A1 Sep. 19, 2002

(30) Foreign Application Priority Data

Mar. 13, 2001 (IT) ..................... BO2001A0134

(51) Int. Cl.[7] .................................................. B23C 1/12
(52) U.S. Cl. ..................... 409/212; 409/202; 409/213; 408/53
(58) Field of Search ............................. 409/202, 212, 409/192, 203, 213, 217; 408/53

(56) References Cited

U.S. PATENT DOCUMENTS 4,872,417 A * 10/1989 Kuwabara et al. .......... 118/411
4,994,979 A * 2/1991 Bruder et al. ............... 700/167
5,163,793 A * 11/1992 Martinez .................... 409/205
5,293,022 A    3/1994 Onandia-Alberdi
5,379,509 A * 1/1995 Mills et al. .................. 29/558
5,393,288 A * 2/1995 Miyasaka et al. ............. 483/1
6,067,695 A * 5/2000 Momoitio ................... 29/26 A
6,161,995 A * 12/2000 Wakazono et al. .......... 409/191

FOREIGN PATENT DOCUMENTS

| DE | 19963863 | 7/2001 | |
| EP | 0835720 | 4/1998 | |
| EP | 1004397 | 5/2000 | |
| GB | 1416638 | 12/1975 | |
| JP | 04250911 A * | 9/1992 | ............ B23C/1/12 |

* cited by examiner

Primary Examiner—Erica Cadugan
Assistant Examiner—Dana Ross
(74) Attorney, Agent, or Firm—Davidson Berquist Klima & Jackson, LLP

(57) ABSTRACT

The automatic machine tool comprises two parallel longitudinal guides supported by a plurality of columns standing on a base, the guides being slidably engaged with two parallel sliding crossbeams that mount respective machining units. The drive motion for the sliding crossbeams running in the guides is provided by linear electric motors.

8 Claims, 5 Drawing Sheets

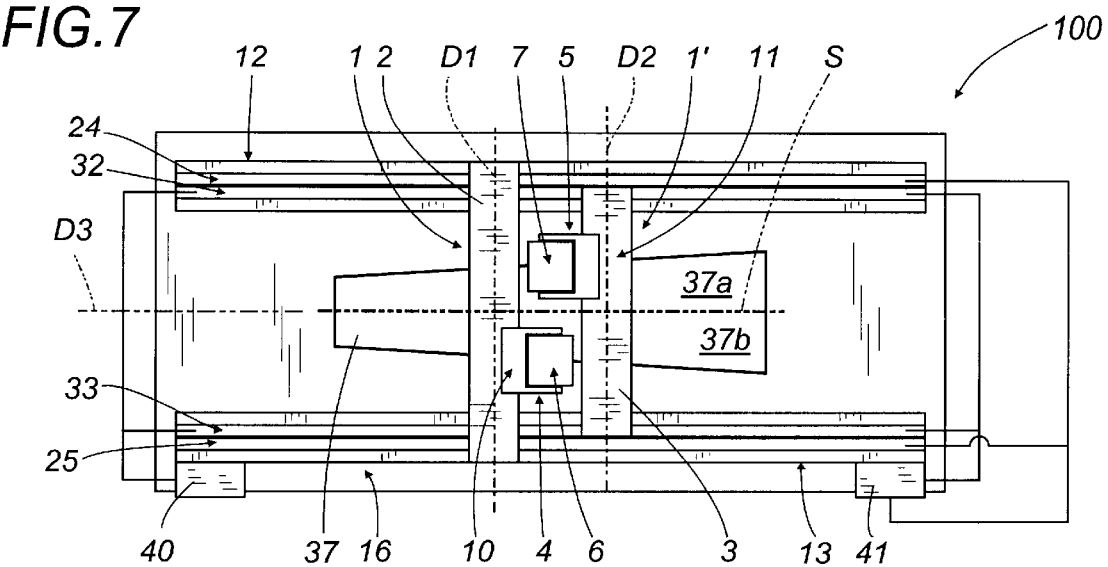
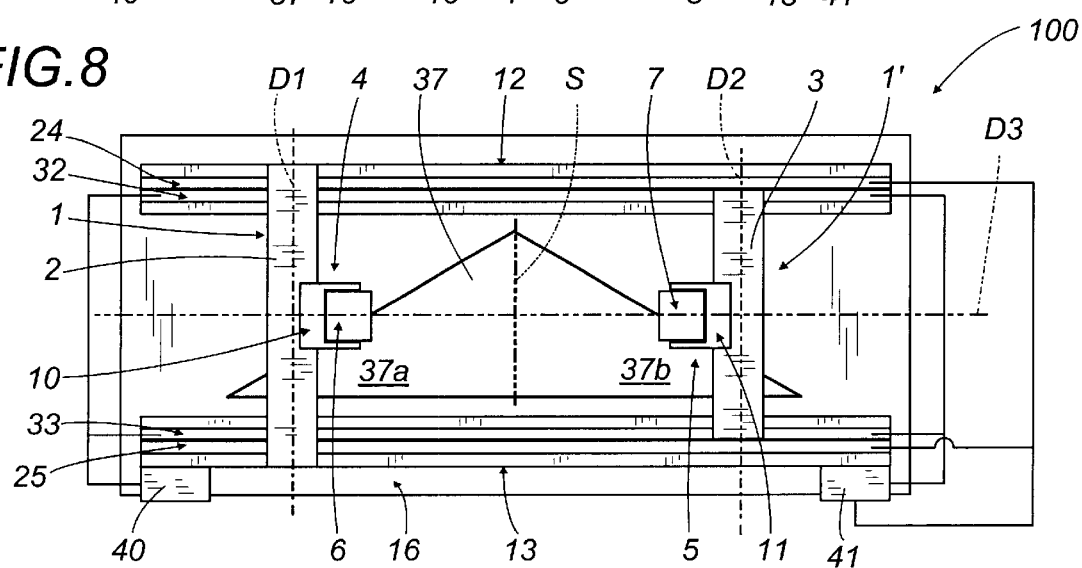
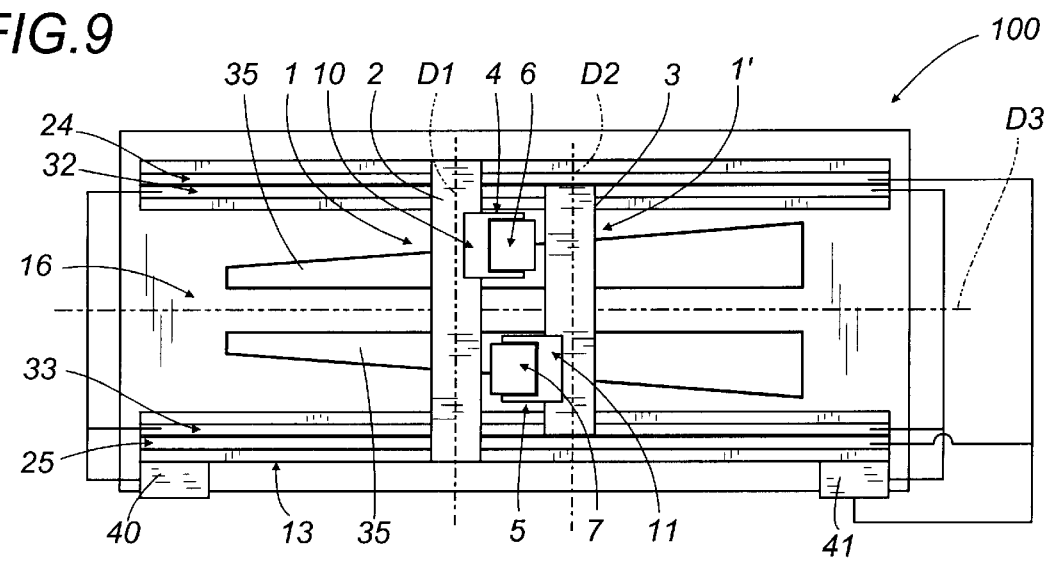

MACHINE TOOL

BACKGROUND OF THE INVENTION

The present invention relates to a machine tool with mobile crossbeams, mobile uprights or mobile gantry structure.

The invention relates in particular to a device for driving the crossbeams in a machine tool mounted on a frame and where the crossbeams have machining units mounted on them.

In certain mechanical engineering industries, such as the automotive and aeronautical industries, where components to be machined may be extremely large, the automatic machinery used must be designed to support large bulky workpieces. For this reason, automatic machine tools or machining centers are known to have two parallel longitudinal guides each supported by a corresponding upright. The operating units that machine the workpiece are mounted on crossbeams which run in the guides.

In known machines of this type, the sliding crossbeams running in the longitudinal guides are driven by mechanical actuating devices which position each crossbeam at the position necessary to machine the workpiece and which move the crossbeam itself so as to start the feed motion of the machining unit.

Mechanical devices for driving the sliding crossbeams, such as, for example, devices with rack and pinion mechanisms or recirculating ball screws, have several drawbacks. One of the drawbacks is the relative slowness with which the crossbeams are moved along the guides. This slowness leads to extremely lengthy starting response times and limited acceleration rates depending also on the bulk and weight of the mechanical parts concerned.

Another drawback connected with the use of these mechanical driving devices is that the frictional forces applied to the guides, again depending on the bulk and weight of the sliding crossbeams, are proportionally very high. This leads to rapid overheating and wear of the mechanical components.

Other drawbacks of conventional mechanical driving devices are due to the frequent adjustments they require in order to reduce the measurement errors that occur also on account of the considerable lengths traveled by the crossbeams in the longitudinal guides.

The present invention has for an object to provide a machine tool with mobile crossbeams that overcomes the above mentioned drawbacks.

SUMMARY OF THE INVENTION

Accordingly, the invention provides a machine tool comprising two parallel longitudinal guides extending in a first principal direction, two substantially parallel crossbeams extending in a second direction substantially perpendicular to the first principal direction of the longitudinal guides, the crossbeams mounting respective machining units and running in the guides in the first direction. In the machine according to the invention, the drive motion for the sliding crossbeams running in the guides is provided by linear electric motors.

BRIEF DESCRIPTION OF THE DRAWINGS

The invention will now be described with reference to the accompanying drawings which illustrate preferred, non-limiting embodiments of it and in which

FIGS. 4, 5, 6 and 7 are schematic plan views in a smaller scale than in the previous figures showing the machine tool of FIG. 1 in four different operating modes;

FIG. 8 is a schematic plan view showing an alternative configuration of the machine tool illustrated in FIG. 7;

FIGS. 9 and 10 are schematic plan views showing two different alternative configurations of the machine tool illustrated in FIG. 5;

DESCRIPTION OF THE PREFERRED EMBODIMENTS

Figure 1:
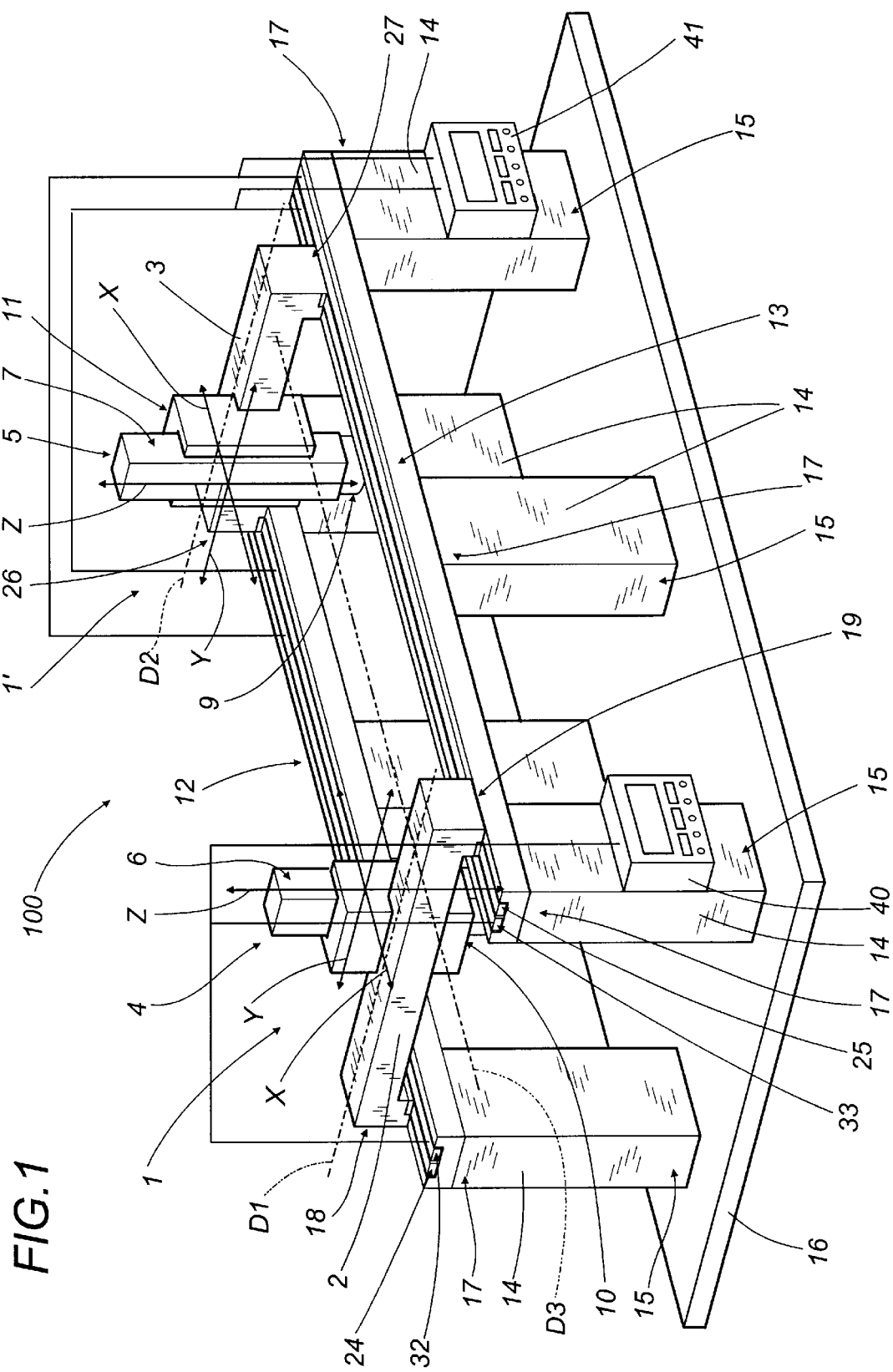
FIG. 1 is a schematic perspective view of a machine tool according to the present invention.
Figure 11:
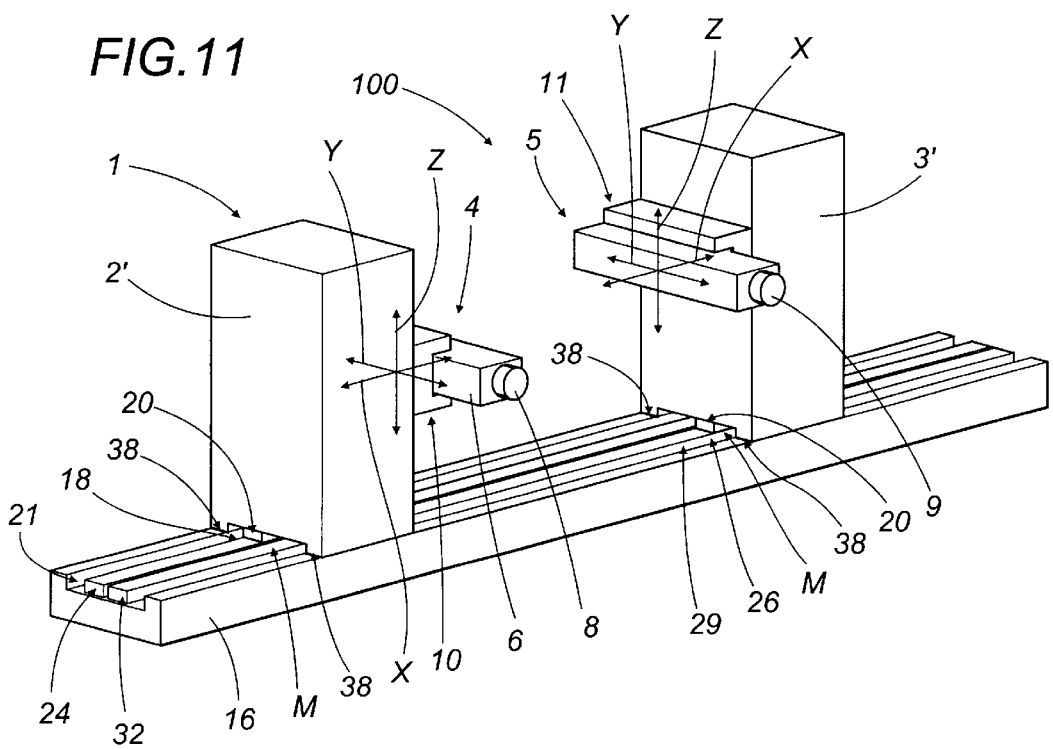
FIG. 11 is a schematic perspective view of a second embodiment of the machine tool according to the present invention.

With reference to FIGS. 1 and 11, the numeral 100 denotes in its entirety an automatic machine tool comprising two structures 1, 1' mounting respective machining units 4, 5. More specifically, in FIG. 1, the mounting structures 1, 1' are two crossbeams 2 and 3, whilst in FIG. 11, they are two uprights 2', 3'.

In both cases, the machining units 4, 5 can move in three-dimensional space along the three linear axes X, Y and Z of respective Cartesian reference systems.

Figure 2:
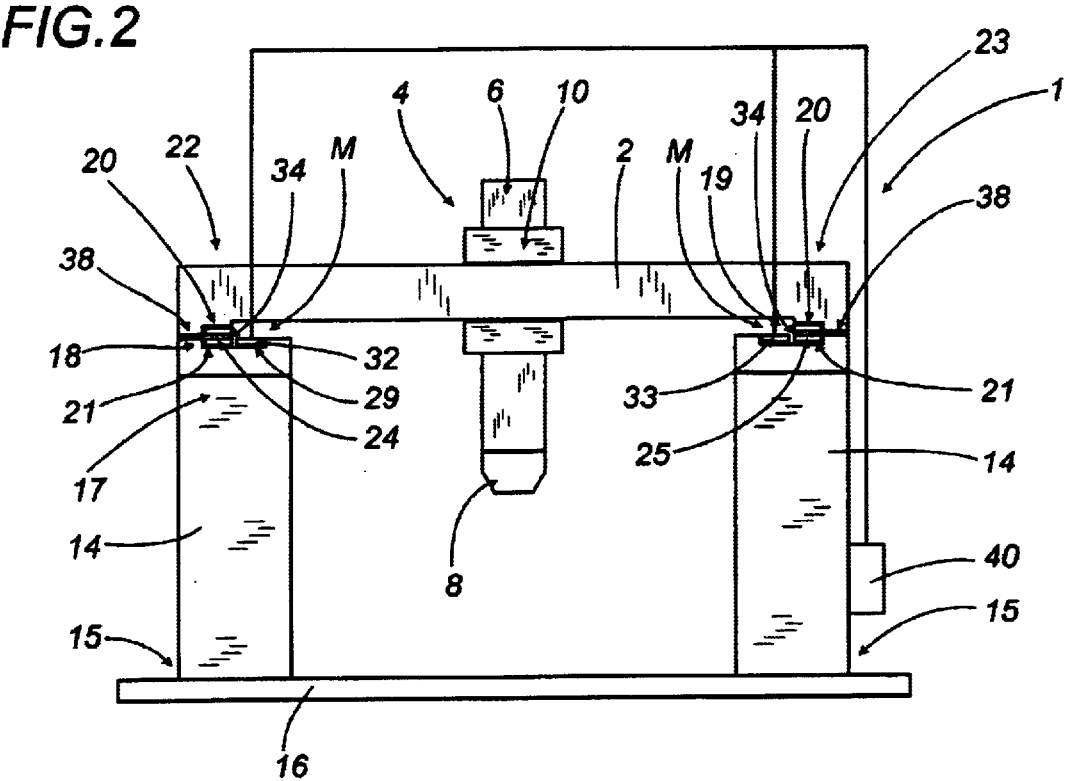
FIG. 2 is a front view, with some parts cut away in order to better illustrate others, of the machine tool shown in FIG. 1.
Figure 3:
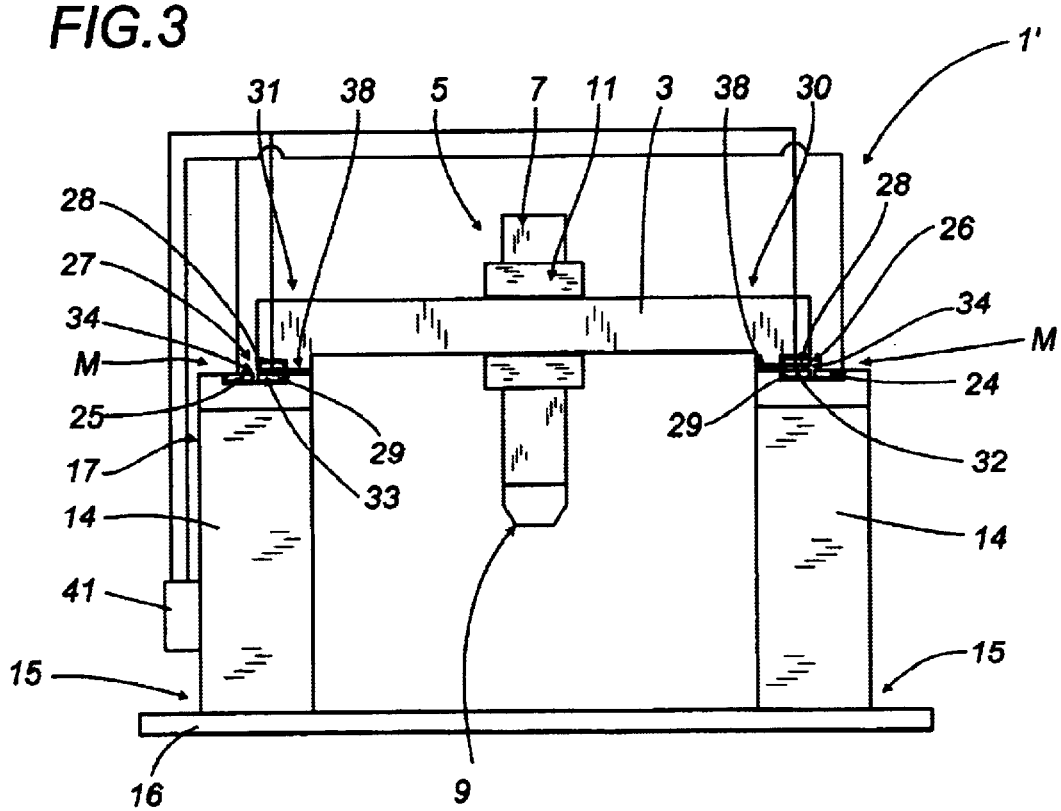
FIG. 3 is a rear view, with some parts cut away in order to better illustrate others, of the machine tool shown in FIG. 1.

As shown in FIG. 1, each of the machining units 4, 5, which are of conventional type and therefore not illustrated in detail, comprises a slide 6, 7 that mounts a tool holder spindle 8, 9 shown in FIGS. 2 and 3. The slide 6, 7 is slidably engaged with a supporting element 10, 11 in which it runs in the direction Z.

The supporting elements 10, 11 can move in the direction Y relative to the respective crossbeams 2, 3 through customary driving means which are not described in further detail.

The two crossbeams 2 and 3 extend in a respective principal direction D1, D2 that is substantially parallel to the Y-axis of the Cartesian reference system.

The two crossbeams 2, 3 are supported by two longitudinal guides 12, 13 extending in a principal direction D3 that is substantially parallel to the direction X, the guides 12, 13 being supported by a plurality of columns 14.

The columns 14 have respective lower ends 15 connected to a base 16 of the machine tool 100 and respective upper ends 17 connected to the longitudinal guides 12, 13.

The crossbeams 2, 3 can slide in the longitudinal guides 12, 13 in the direction D3 so as to guide the machining units 4, 5 in the movements the latter are required to perform in order to machine the workpieces in the automatic machine tool 100.

As illustrated in FIG. 1, the machine 100 comprises two numerical control units 40, 41 for controlling the machining units 4, 5 mounted on the crossbeams 2 and 3 so that the machine 100 can perform the required machining operations. The units 40, 41 are located at two columns 14 opposite each other in the direction D3.

Each control unit 40, 41 can be programmed to make the respective machining unit 4, 5 perform a defined sequence of operations such as, for example, part programs, through specific software.

In particular, the control unit 40 is specifically dedicated to the machining unit 4 located on the first crossbeam 2, while the control unit 41 can control either only the machining unit 5 located on the second crossbeam 3, or both the machining units 4, 5, depending on the preset operating mode.

As shown in FIG. 2, the first crossbeam 2 is driven in the direction D3 by two linear electric motors 18, 19. Each of the two linear electric motors 18, 19 comprises a primary member or rotor 20 and a secondary member or stator 21.

The two primary members 20 are integral with the first crossbeam 2 at the two opposite ends of it 22, 23.

The two secondary members 21 consist of two respective parallel slideways 24, 25, each extending along one of the longitudinal guides 12, 13.

As shown in FIG. 3, the second crossbeam 3, like the first crossbeam 2, is driven in the direction D3 by two linear electric motors 26, 27. Each of the two linear electric motors 26, 27 comprises a primary member or rotor 28 and a secondary member or stator 29.

The two primary members 28 are integral with the second crossbeam 3 at the two opposite ends of it 30, 31.

The two secondary members 29 consist of two respective parallel slideways 32, 33, each extending along one of the longitudinal guides 12, 13 and running parallel to and side by side with the slideways 24, 25 of the first crossbeam 2 on the inside of them in such a way as not to create interference between the two respective linear electric motors 18, 26, 19, 27 of each crossbeam 2, 3 running in the same longitudinal guide 12, 13.

The respective primary members 20, 28 and secondary members 21, 29 of each motor 18, 19, 26, 27 are positioned opposite each other and separated by a suitable air gap 34 according to the known operating principle of linear electric motors.

The linear electric motors 18, 19, 26, 27 constitute motor means labeled M in their entirety.

Advantageously, each crossbeam 2, 3 comprises means, illustrated schematically in the drawings and labeled 38, for sliding the crossbeams 2, 3 in the longitudinal guides 12, 13. The means 38, which are of known type and not further described, are also designed to keep the air gap 34 between the primary member 20, 28 and the secondary members 21, 29 at a constant value.

With reference to FIG. 11, the machining units 4, 5 of the machine 100 are mounted on the mobile uprights 2', 3' instead of on the crossbeams 2, 3. Other components of the machine 100 illustrated in FIG. 11 are the same in form and function as those already described with reference to FIGS. 1 to 10. For convenience, these components are labeled with the same reference numbers as those in FIGS. 1 to 10.

Figure 4:
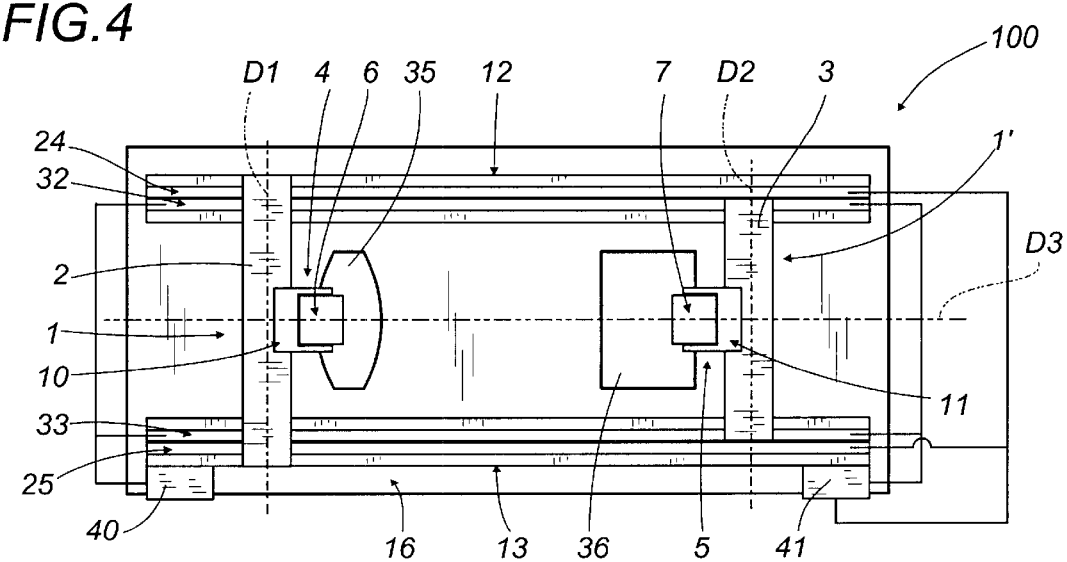

In the operating mode shown in FIG. 4, the machining units 4, 5 mounted on the respective crossbeams 2, 3 of the machine tool 100 perform different operations on two respective workpieces 35, 36 positioned in two separate working areas.

In this first operating mode, the machine 100 can, if necessary, perform completely different process cycles on completely different workpieces 35, 36. In other words, the two machining units 4, 5 work like two separate machine tools running different part programs.

Thus, the control unit 40 controls the machining unit 4 on the first crossbeam 2 and runs a first part program, while the control unit 41 controls the machining unit 5 on the second crossbeam 3 and runs a second part program that differs from the first part program of the machining unit 4.

Figure 5:
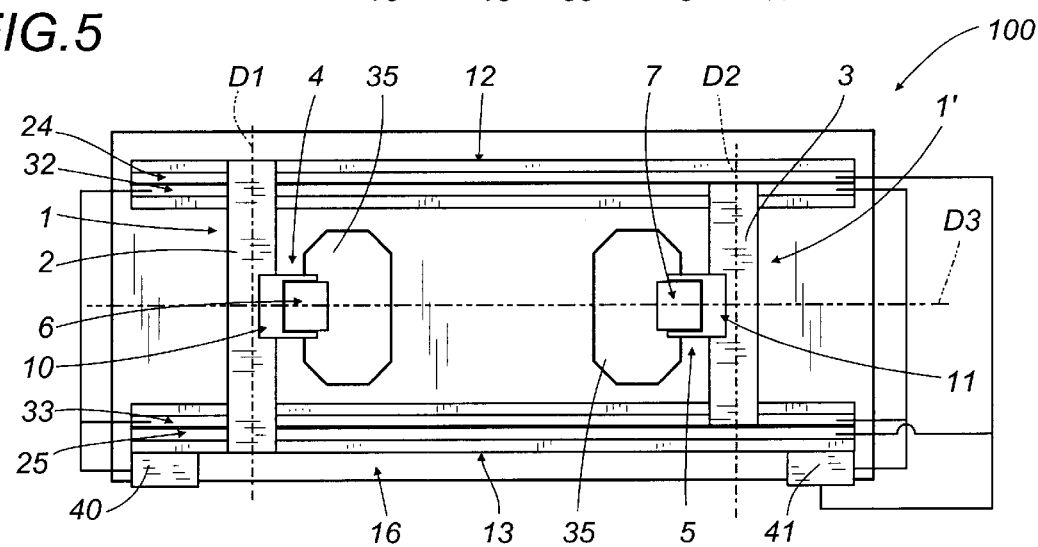

In FIG. 5, the machining units 4, 5 mounted on the two crossbeams 2, 3 of the machine tool 100 perform the same process cycle on two identical workpieces 35.

In this second operating mode, the machine 100 makes it possible to perform the same process cycle on two identical workpieces 35 simultaneously and in a substantially synchronized manner, thus doubling the productivity of the machine 100 compared to a machine with only one machining unit.

In other words, the control unit 41 controls both of the machining units 4, 5 on the crossbeams 2 and 3, running one part program only, while the control unit 40 remains idle.

Figure 6:
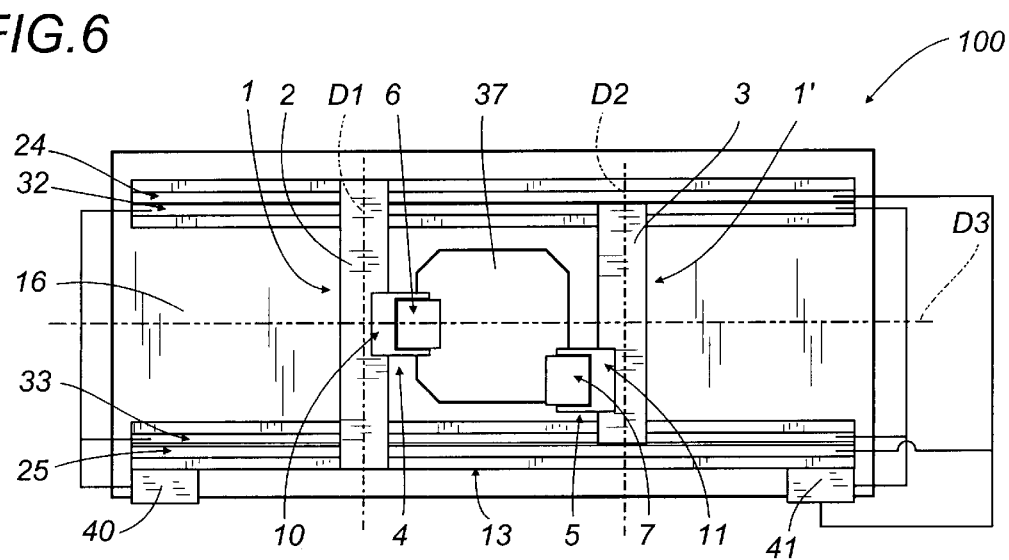

In FIG. 6, the machining units 4, 5 mounted on the two crossbeams 2, 3 of the machine tool 100 perform different process cycles on the same workpiece 37.

In this third operating mode, the machine 100 makes it possible to simultaneously perform different process cycles, where customary machines would perform them in succession. This reduces production time because it allows two different tools to be used simultaneously on the two machining units 4, 5.

Thus, as described above with reference to FIG. 4, the control unit 40 controls the machining unit 4 on the first crossbeam 2 and runs a first part program, while the control unit 41 controls the machining unit 5 on the second crossbeam 3 and runs a second part program that differs from the first part program of the machining unit 4.

In FIG. 7, the two machining units 4, 5 mounted on the two crossbeams 2, 3 of the machine tool 100 perform the same process cycle on a single workpiece 37 having two portions 37a, 37b that are symmetrical about an axis of symmetry S parallel to the direction D3.

In this fourth operating mode, the machine 100 makes it possible to simultaneously perform identical process cycles, where customary machines would perform them in succession.

Again, as in the third operating mode described above, the control unit 41 controls both of the machining units 4, 5 on the crossbeams 2 and 3, running one part program only.

Evidently, the position of the axis of symmetry S of the workpiece 37 is unimportant and therefore the operating mode illustrated in FIG. 8, where the axis of symmetry S is perpendicular to the direction D3, is similar to the operating mode described with reference to FIG. 7.

As shown in FIG. 9 and as described with reference to the second operating mode, illustrated in FIG. 5, the machine 100 enables the two machining units 4, 5 on the two crossbeams 2 and 3 to perform synchronized process cycles on two identical workpieces 35 extending lengthways principally in the direction D3 and positioned symmetrically about the direction D3 itself.

Figure 10:
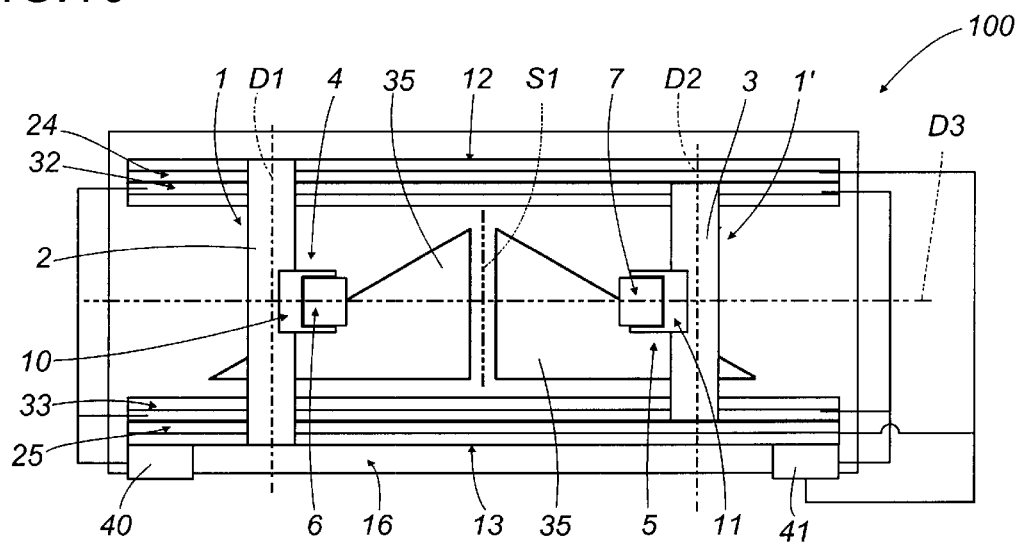

With reference to FIG. 10, the machine 100 enables the two machining units 4, 5 on the two crossbeams 2 and 3 to perform synchronized process cycles on two identical workpieces 35 positioned symmetrically about an axis S1 parallel to the direction D1.

Use of the linear motors 18, 19, 26, 27 to drive the two crossbeams 2, 3 considerably simplifies the structure and operation of the machine 100, with obvious advantages in terms of both running and maintenance costs.

Advantageously, the machine 100 comprises an anticollision program set in at least one of the two control units 40, 41 and designed to prevent the two machining units 4,5 from colliding in the event of a programming error in one of the part programs or any other reason such as to apply a movement that causes the feed paths of the machining units 4, 5 to overlap in one of the directions D1, D2, D3.

In such an event, the anticollision program, by monitoring the instantaneous positions of the two machining units 4, 5 using customary sensors, stops the relative movement of the machining units 4, 5 and, if necessary, generates visual and/or audible warning signals to alert the operator to the fault in the machine 100.

In the machine 100 illustrated in FIG. 11, the machining units 4, 5 are mounted on the uprights 2', 3'. In this embodiment of the invention, the machine 100 operates in substantially the same way as that described above for the machine 100 equipped with mobile crossbeams 2, 3. In particular, its operating modes are similar to those described above with reference to FIGS. 4 to 10 and therefore they are not further described.

What is claimed:

1. A machine tool comprising: a first structure and a second structure mounting respective machining units; at least one guide extending in a principal direction; said first structure and second structure being driven by respective linear electric motor means in said at least one guide, to slide in said at least one guide independently of each other; wherein each of the linear electric motor means comprises a primary member integral with the respective structure and a secondary member extending along said at least one guide; the machine tool further comprising a programmable control unit connected and specifically dedicated to the machining unit located on the first structure and a control unit connected to the first structure and to the second structure, to control selectively either only the machining unit located on the second structure, or both the machining units, depending on the preset operating mode, to make the machining units perform defined sequences of operations.

2. The machine tool according to claim 1, wherein the machining units mounted on the mounting structures work substantially simultaneously on at least two respective work-pieces and perform two different process cycles on them.

3. The machine tool according to claim 1, wherein the machining units mounted on the mounting structures work in a substantially synchronized manner on at least two respective work-pieces, performing the same process cycle on them.

4. The machine tool according to claim 1, wherein the machining units mounted on the mounting structures work substantially simultaneously on the same workpiece and perform different process cycles on it.

5. The machine tool according to claim 1, wherein the machining units mounted on the mounting structures work on a single workpiece which has at least one axis of symmetry forming at least two symmetrical portions of the workpiece, the machining units performing substantially synchronized identical process cycles on the two symmetrical portions.

6. The machine tool according to claim 1, wherein the control unit comprises an anticollision program to prevent the two machining units from colliding with each other during processing of the workpieces on the machine.

7. The machine tool according to claim 1, comprising two parallel longitudinal guides extending in a first principal direction, the structures comprising two substantially parallel crossbeams extending in a second direction substantially perpendicular to the first principal direction of the longitudinal guides, the crossbeams mounting respective machining units and running in the guides in the first direction, the drive motion for the sliding crossbeams running in the guides being provided by linear electric motors.

8. The machine tool according to claim 1, comprising two parallel longitudinal guides extending in a first principal direction, the structures comprising two substantially parallel uprights extending in a vertical direction substantially perpendicular to the first principal direction of the longitudinal guides, the uprights mounting respective machining units and running in the guides in the first direction, the drive motion for the uprights running in the guides being provided by linear electric motors.

* * * * *